Oct. 14, 1947. W. P. ALBERT ET AL 2,428,767
ELECTRIC MOTOR CONTROL CIRCUITS
Filed Sept. 15, 1943
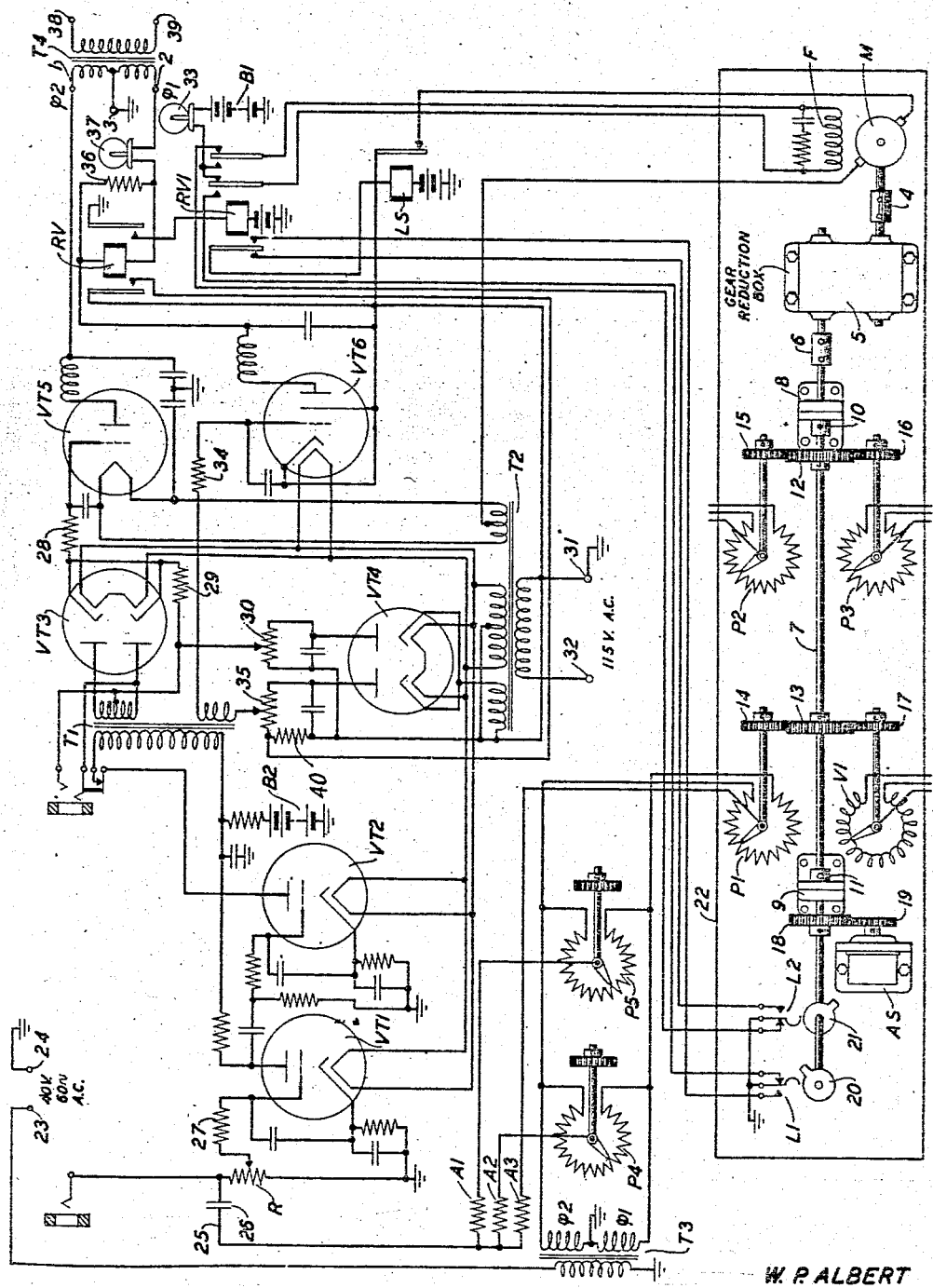
INVENTORS
W. P. ALBERT
R. C. DAVIS
R. H. GUMLEY
W. H. T. HOLDEN
BY
P. C. Smith
ATTORNEY Patented Oct. 14, 1947

2,428,767

UNITED STATES PATENT OFFICE 2,428,767

ELECTRIC MOTOR CONTROL CIRCUITS

Walter P. Albert, Madison, N. J., and Richard C. Davis, Great Neck, Robert H. Gumley, Whitestone, and William H. T. Holden, Woodside, N. Y., assignors to Bell Telephone Laboratories, Incorporated, New York, N. Y., a corporation of New York Application September 15, 1943, Serial No. 502,484

11 Claims. (Cl. 172—239)

1

This invention relates to control systems and more particularly to aircraft trainers whereby in response to electrical changes imposed upon some of the circuits in response to the operation of the flight or other controls of the trainer in simulation of the operation of an aircraft, electrical changes are imposed upon other circuits of the trainer.

It is an object of the present invention to provide a control system especially adapted to aircraft trainers, although capable of general use, wherein a reversible direct current motor, operable to control the setting of indicators, variable potentiometers, variable autotransformers or other control devices is operated by alternating current potential to maintain the angular setting of such devices in exact positions dictated by the setting of remotely located controlling elements.

Another object of the invention is to provide a control system that is substantially independent of the rapidity with which the remote control elements are moved from one position to another.

Another object of the invention is to provide a means for causing a servo mechanism to readjust the control circuits thereof to a balanced condition at a rate corresponding to the amount of unbalance at any instant.

The foregoing objects and others pertinent thereto are accomplished by providing a first electronic device responsive to either a negative or a positive phase unbalance of the network supplied by alternating current potentials from one or more remotely located control elements, which establishes the rotor circuit of a direct current motor upon positive waves of the current and by providing a second electronic device, responsive only to the unbalance of the network in one phase, which establishes the circuit of a relay upon each positive wave of the current and causes the operation of a second relay to reverse the stator circuit of the motor whereby the direction of rotation of the motor is reversed. The motor when operated in either direction of rotation is effective to operate variable potentiometers, variable autotransformers and synchro-transmitters for controlling the synchronous operation of synchro-repeaters associated with remotely located indicators and is effective through the operation of one of the variable potentiometers or autotransformers to restore the balance to the network to thereby arrest the rotation of the motor.

The novel features of the invention are set forth in the appended claims and the invention as to its organization and its mode of operation will be

2 best understood from the following detailed description when read in connection with the single sheet of drawings.

In the drawing, the motor M, limit switches L1 and L2, potentiometers P1, P2, P3, P4 and P5 and variable autotransformer V1, for clarity of disclosure, have been illustrated schematically as disclosed in a plane at right angles to the plane of their associated operating shafts. The motor M is provided with a stator or field winding F which is excited from the source B1 of direct current supplied over the right contacts of reversing relay RV1 and contacts of the limit switches L1 and L2. The rotor or armature winding of motor M is supplied with 115 volt, 60-cycle current supplied from terminals 1 and 3 of the divided secondary winding of transformer T4, the primary winding of which transformer is connected to the terminals 38 and 39 of a source of alternating current. The potentials produced between the pair of terminals 2 and 3 and between the pair of terminals 1 and 3 will hereinafter be referred to as first sources of alternating current of opposite phases $\phi 1$ and $\phi 2$.

The motor shaft of the motor M is connected by coupling 4 to the driving shaft of a reduction gear box 5, the driven shaft of which is connected by a second coupling 6 to a shaft 7 which is journaled in the bearings 8 and 9. To prevent axial movement of the shaft 7 with respect to the bearings, collars 10 and 11 are secured by suitable set screws to the shaft adjacent to the bearings. Secured at convenient positions along the shaft are a plurality of gears 12, 13, etc., which are effective to drive the brush shafts of variable potentiometers such as P1, P2 and P3 or of variable autotransformers such as V1. For this purpose the brush shaft of each potentiometer or autotransformer is provided with a gear such as 14, 15, 16, 17, etc., meshed with the gears 12 and 13.

The shaft 7 may also be effective to drive a synchronous transmitter such as AS through the gear 18 secured to the shaft 7 and the gear 19 secured to the rotor shaft of the transmitter.

To insure that the shaft 7 may not be driven through an angular distance greater than the maximum allowable travel of the brushes of the potentiometers and autotransformers driven by the shaft, limit switches L1 and L2 are provided. Each limit switch comprises a set of transfer springs operable by a cam finger adjustably secured to the shaft 7. For example, the springs of switch L1 are operable by the cam finger 20 to cut off the current flowing through the stator or field winding F of motor M when the shaft 7 has been rotated in one direction to the permissible limit, and the springs of switch L2 are operable by the cam 21 to cut off the current flowing through the winding F when the shaft 7 has rotated in the other direction to the permissible limit.

The motor, gear reduction box, limit switches, potentiometers, variable autotransformers, synchro-transmitters and bearings for the shaft 7 may all be secured in any desired manner to a base plate 22.

For controlling the motor M two triode amplifier tubes VT1 and VT2, two dual diode rectifying tubes VT3 and VT4, two gas-filled tubes VT5 and VT6 and three relays RV, RV1 and LS are provided. The tubes VT1 and VT2 are connected in tandem and serve to receive an input potential, to amplify it and through the step-up transformer T1 to apply it to the anodes of the rectifier tube VT3. The tube VT3 serves as a full wave rectifier to rectify the input potential applied to its anodes and to apply it as a positive potential to the grid of the gas-filled tube VT5. The output potential from the tube VT2 is also applied through the lower secondary winding of transformer T1 to the control grid of the gas-filled tube VT6.

Filament heating current is supplied from a source of alternating current through windings of the power transformer T2 and direct current for furnishing normal grid biasing potentials to the control grids of the tubes VT5 and VT6 is supplied from the alternating current source through the power transmitter T2 and the dual rectifier tube VT4. Anode potential is applied to tubes VT1 and VT2 from battery B2 and 60-cycle alternating current is supplied to the anodes of tubes VT5 and VT6 from the divided secondary winding of transformer T4, the current supplied to tube VT6 being displaced 180 degrees in phase from the current supplied to tube VT5.

While the amplifier tubes VT1 and VT2 have been disclosed as separate tubes, it is to be understood that their elements may be mounted within a single envelope to form a dual-triode amplifier.

The apparatus employed to embody the invention having now been briefly discussed, the mode of operation of the invention will now be described. It will be assumed that the motor-control circuit is responsive to potentials applied from potentiometers or variable autotransformers operated by the motors of similar motor-control circuits or operated under manual control. Potentiometers P4 and P5 driven by the motor shafts of two other motor-control circuits have been illustrated. The windings of these potentiometers are energized from a source of 40-volt alternating current of 60 cycles frequency connected across the terminals 23 and 24 and applied through the windings of the power transmitter T3. The secondary winding of transformer T3 has its mid-point connected to ground and therefore potentials 180 degrees apart in phase, hereinafter referred to as potentials of phases $\phi 1$ and $\phi 2$, are simultaneously applied to the end terminals of the potentiometers P4 and P5. Potentials of opposite phase are also applied from the secondary winding of transformer T3 to the end terminals of the balancing potentiometer P1 driven by the shaft 7.

The brushes of potentiometers P1, P4 and P5 are connected through equal resistances A3, A2 and A1, respectively, to conductor 25 which in turn is connected through condenser 26 and through the winding of rheostat R to ground. The resistances A1, A2 and A3, are very high in comparison with the impedance of the signal sources so that they act as potential dividers and control the grid of tube VT1 on a potential basis in the well-known manner. When any potentiometer brush is so positioned as to engage the central point of its winding no potential will be applied from the secondary winding of transformer T3 over such brush to conductor 25. It will be assumed, however, that the brushes of both potentiometers P4 and P5 have been moved in a counter-clockwise direction toward the lower end terminals of their respective windings to indicate to the motor-control circuit disclosed that changes have occurred in the motor-control circuits with which such potentiometers are associated and which changes require a change in the condition of the motor-control circuit illustrated.

At a given instant, potential of phase $\phi 1$ will be applied over the circuit extending from ground through the lower portion of the secondary winding of transformer T3, over the lower portion of the winding of potentiometer P4 and the brush thereof through resistance A2, over conductor 25, through condenser 26 and through the winding of rheostat R to ground and, at the same instant, potential of the opposite phase $\phi 2$ will be applied over the circuit extending over the upper portion of the secondary winding of transformer T3, over the upper portion of the winding of potentiometer P4 and the brush thereof and thence as traced through the winding of rheostat R to ground. These potentials being of opposite phase will tend to balance each other but, due to the position of the potentiometer brush, potential of phase $\phi 1$ will predominate. Potential of phase $\phi 1$ will also be applied over the circuit extending from ground through the lower portion of the secondary winding of transformer T3, over the lower portion of the winding of potentiometer P5 and the brush thereof, through resistance A1 and thence as traced through the winding of rheostat R to ground and, at the same instant, potential of the opposite phase $\phi 2$ will be applied over the circuit extending over the upper portion of the secondary winding of transformer T3, over the upper portion of the winding of potentiometer P5 and the brush thereof, through resistance A1 and thence as traced through the winding of rheostat R to ground. These potentials being of opposite phase will also tend to balance each other but, due to the position of the brush of potentiometer P5, potential of phase $\phi 1$ will predominate.

The predominating potentials of phase $\phi 1$ are added at the rheostat R and a derived signal potential dependent upon the setting of the gain-control rheostat R is applied through resistance 27 to the control grid of amplifier tube VT1 thereby changing the grid bias of this tube. The tube VT1 responding to the change in grid bias amplifies the input signal potential and applies it, inverted in phase, to the input side of the amplifier tube VT2 which tube further amplifies and inverts the potential and applies it to the primary winding of the step-up input transformer T1. The transformer T1 again inverts the signal potential and applies it over its upper secondary winding and through the full wave rectifier tube VT3 to the control grid of the gas-filled tube VT5 as a positive potential of phase φ2 or opposite in phase to the initial signal potential applied to conductor 25 by the potentiometers P4 and P5.

The grid of tube VT5 is normally negatively biased to a point just below the critical breakdown potential of the tube over a biasing circuit which extends from the grid of tube VT5, through the resistances 28 and 29, over the biasing rheostat 30, the winding of which is bridged across the cathode-anode path of the right unit of rectifier tube VT4, thence through the left secondary winding of power transformer T2 to the grounded terminal of the commercial source of alternating current connected to the terminals 31 and 32.

When signalling potential of phase φ2 is impressed upon the grid of tube VT5 from the rectifier tube VT3, tube VT5 becomes conducting since at that instant potential of the same phase φ2 is applied to its anode and current therefore flows from the alternating current supply connected between terminals 1 and 3, during each positive half cycle over the cathode-anode path through tube VT5, over the mid-point connection of the right secondary winding of power transformer T2 which supplies filament heating current to tube VT5, through the armature winding of motor M, over the back contact of limit switch relay LS to ground, thus energizing the armature winding of motor M by positive impulses derived from the 60-cycle alternating anode current. The stator or field winding F of motor M is energized in a circuit which may be traced from the positive terminal of battery B1, through the protective resistance lamp 33, over the inner right back contact of relay RV1, through the winding F, over the outer right back contact of relay RV1 and over the normal contacts of the transfer contact set of limit switch L2 to ground. Motor M thereupon starts operating, for example, in a clockwise direction, and at a speed determined by the potential of the incoming signal as amplified, rectified and impressed upon the grid of the gas-filled tube VT5.

So long as the tube VT5 is repeatedly firing in response to the positive half waves of its anode potential, the motor M is receiving impulses from the positive half waves of current flowing therethrough and is thereby intermittently accelerated. During each interval that the tube VT5 is non-conductive motor M is coasting at a substantially uniform speed and is thereby producing a counter-electromotive force which is proportional to the speed of the motor. This counter-electromotive force is applied between ground connected over the back contact of relay LS to the right brush of motor M and the filament of tube VT5 which is connected over the mid-point of the right secondary winding of transformer T2 to the left brush of the motor. Since the grid of tube VT5 is connected through resistances 28 and 29, through the right unit of rectifier tube VT4 and through the left secondary winding of transformer T2 to ground, this counter-electromotive force renders the filament more positive with respect to the grid and as the motor speeds up under the influence of the anode current the counter-electromotive force builds up to a greater and greater value until it is sufficiently high to neutralize the grid potential supplied through the tube VT3 from the incoming signal and thereby to cause the grid potential to fall below the critical potential and consequently to cut off conduction through the tube VT5. Thereupon the motor no longer being supplied with current impulses tends to slow down and the counter-electromotive force consequently decreases to a point where it is no longer sufficient to neutralize the applied positive grid potential whereupon the tube again becomes conducting. This phenomenon is repeated and results in the motor attaining a constant speed determined by the potential of the incoming signal. This operation of the motor is similar to that described in Patent No. 2,121,054, granted June 21, 1938, to H. A. Satterlee.

The rectifier tube VT3 is so poled that it prevents this counter-electromotive force from backing up through the transformer T1 and to the control network.

As the motor operates it transmits power through the reduction gear box 5 to the shaft 7 which turns at its low speed and in turn rotates the brushes of the variable potentiometers P1, P2 and P3 and the brush of the variable autotransformer V1 and causes the rotation of the rotor of the synchro-transmitter AS all in a clockwise direction. The shaft of potentiometer P1 is so geared to shaft 7 that the brush of such potentiometer will be moved by the rotation of shaft 7 toward the upper terminal of its winding. Potential of phase φ2 will now be applied over a circuit which may be traced from ground, over the upper portion of the secondary winding of transformer T3, over the upper portion of the winding of potentiometer P1 and the brush thereof, through resistance A3, conductor 25, condenser 26 and through the winding of rheostat R to ground and, at the same instant, potential of the opposite phase φ1 will be applied over a circuit through the lower portion of the secondary winding of transformer T3, over the lower portion of the winding of potentiometer P1 and the brush thereof, through resistance A3 and thence as traced through the winding of rheostat R to ground. These potentials being of opposite phase will tend to balance each other but due to the position of the brush of potentiometer P1, potential of phase φ2 will predominate. As the motor M rotates the brush of potentiometer P1 toward its upper winding terminal the potential of phase φ2 applied over the circuit just traced through resistance A3 is increased until it reaches a value which is equal to but opposite in phase to the sum of the potentials of phase φ1 applied through resistances A1 and A2.

As the balancing potential increases, the potential applied through resistance 27 to the control grid of tube VT1 gradually decreases resulting in a reduction of the speed of the motor M until when the brush of potentiometer P1 has been moved to a point where the potential applied thereover to conductor 25 balances the potential applied to conductor 25 over the brushes of potentiometers P4 and P5, no potential is applied to the grid of tube VT1 from conductor 25. As a consequence tube VT5 ceases to conduct and the motor M comes to rest. The motor M thus operates the potentiometer P1 to balance the network at a rate corresponding to the amount of the unbalance at any given instant.

At the time potential was impressed upon the upper secondary winding of transformer T1 in response to an incoming signal potential to cause the firing of tube VT5 and the operation of motor M, potential was also impressed upon the lower secondary winding of transformer T1 and applied therefrom through resistance 34 to the control grid of gas-filled tube VT6. The control grid of tube VT6 is normally negatively biased to a point just below the critical breakdown potential of the tube over a biasing circuit which extends from the grid of tube VT6 through resistance 34, through the lower secondary winding of transformer T1, through the biasing rheostat 35, the winding of which is bridged across the cathode-anode path of the left unit of rectifying tube VT4, thence through the left secondary winding of power transformer T2 to the ground terminal 31 of the commercial source of alternating current connected to the terminals 31 and 32.

The anode of tube VT6 is supplied with potential through the winding of reversing relay RV and resistance 36 in parallel and through the protective resistance lamp 37, from the phase $\phi 1$ of the 115 volt 60-cycle current supply which is connected between terminals 2 and 3. It has been assumed that the signal potential applied to conductor 25 is at the instant of phase $\phi 1$ and that therefore potential of phase $\phi 2$ is applied from the secondary winding of transformer T1 to the control grid of tube VT6. Thus the potentials applied at the same instant to the control grid and anode of tube VT6 are of opposite polarity and when during a half wave cycle the signal potential applied to the control grid of the tube VT6 is positive and sufficient to raise the potential on the grid above the critical breakdown potential, the potential applied to the anode will be negative and consequently the tube VT6 will not respond. Relays RV and RV1 therefore remain unoperated and the motor M operates in the direction previously described.

It will now be assumed that a change occurs in one or both of the circuits with which the potentiometers P4 and P5 are associated resulting, for example, in the movement of the brush of potentiometer P4 in a clockwise direction, but that the brush of potentiometer P5 is not moved. It will be further assumed that in the new position of brush P4 potential of phase $\phi 1$ still predominates and is applied over a circuit through the lower portion of the secondary winding of transformer T3, through the lower portion of the winding of potentiometer P4 and the brush thereof, through resistance A2, over conductor 25, through condenser 26 and through the winding of rheostat R to ground. However, this potential is reduced from its former value. The predominating potential of phase $\phi 1$ applied over the circuit through the lower portion of the secondary winding of transformer T3, through the lower portion of the winding of potentiometer P5 and the brush thereof, through resistance A1, over conductor 25, through condenser 26 and through the winding of rheostat R to ground is, however, unchanged.

It will be recalled that in the previous setting of the brush of potentiometer P1 to secure a balance, a predominating potential of phase $\phi 2$ and of sufficient value to balance the $\phi 1$ potential applied through potentiometers P4, P5 was applied to conductor 25. Therefore with the new setting of potentiometer P4 potential of phase $\phi 2$ applied to conductor 25 from potentiometer P1 overbalances the potential of phase $\phi 1$ applied to such conductor and a resultant potential of phase $\phi 2$ is now applied to the control grid of amplifier tube VT1, amplified thereby and by tube VT2 and is impressed upon the primary winding of input transformer T1.

In the manner previously described, this signal potential of phase $\phi 1$ is impressed from the upper secondary winding of transformer T1 upon the rectifier tube VT3 which functions as a full wave rectifier and the rectified positive potential is impressed upon the control grid of tube VT5. Alternating current potential of phase $\phi 2$ is applied to the anode of tube VT5, but due to the fact that the tube VT3 rectifies both half waves of the signal potential, during one half cycle of the anode potential of phase $\phi 2$, both the grid and anode of tube VT5 will be positive and the tube will become conducting resulting in the transmission of an impulse of positive potential through the armature winding of motor M during each positive half cycle of the anode current.

At the same time the signal potential of phase $\phi 1$, is impressed from the lower secondary winding of transformer T1, through the rectifier tube VT4, upon the control grid of tube VT6 and since the tube VT6 is supplied with anode potential of phase $\phi 1$, tube VT6 will become conductive during each positive half cycle of the signal and anode potential sources and will cause the operation of reversing relay RV. Reversing relay RV, upon operating, establishes over its left contact, a short circuit of resistance 40 in the biasing circuit of tube VT6 to increase the positive bias of the tube thereby insuring that relay RV will be held operated so long as tube VT6 continues to conduct in response to the incoming signal potential. At its right contacts relay RV establishes an obvious circuit for reversing relay RV1.

Relay RV1 thereupon operates and at its right contacts reverses the connection of the terminals of the field winding F of the motor M with respect to battery B1 and ground. Now with the tube VT5 conductive, impulses of current applied thereby to the field winding of motor M will flow through the field winding in such a direction as to cause the rotation of the motor, for example, in a counter-clockwise direction and at a speed determined by the potential of the incoming signal. As the motor operates it transmits power through the reduction gear box 5 to the shaft 7 which turns at a slow speed and in turn rotates the brushes of the variable potentiometers P1, P2 and P3 and the brush of the variable autotransformer V1 and causes the rotation of the rotor of the synchro-transmitter AS, all in a counter-clockwise direction. The brush of potentiometer P1 now moving in a counter-clockwise direction decreases the potential of phase $\phi 2$ applied to conductor 25 until it reaches a value which is equal but opposite in polarity to the sum of the potentials applied to conductor 25 through the potentiometers P4 and P5.

As the potential through potentiometer P1 decreases, the potential applied through resistance 27 to the control grid of tube VT1 gradually decreases resulting in a decrease in the potential applied to the grid of tube VT5 whereupon motor M gradually slows down and comes to rest when the brush of potentiometer P1 has moved to a point where the potential applied therefrom to conductor 25 balances the potential applied to conductor 25 over the brushes of potentiometers P4 and P5.

Should the motor M for any reason continue in operation until the shaft 7 has been rotated in one direction or the other until the cam finger 20 has operated the transfer contacts of limit switch L1 or the cam finger 21 has operated the transfer contacts of limit switch L2, relay LS will be operated to open the armature circuit of motor M to stop the motor before any damage can be done to the apparatus driven by the shaft 7. For example if it be assumed that motor M is operating at the time the reversing relay RV1 is unoperated, and the shaft 7 is driven thereby to such an extent that cam finger 21 operates the transfer contacts of limit switch L2, a circuit is established from battery through the winding of relay LS, over the left back contact of relay RV1 over the alternate contacts of switch L2 to ground, whereupon relay LS operates to open the armature circuit of motor M and to thereby stop the motor.

What is claimed is:

1. In an electrical network unbalanced by a change in the magnitude of a condition under observation, a motor having a rotor circuit and a stator circuit, a source of direct current for energizing said stator circuit, a first electronic device responsive to establish the rotor circuit of said motor over the space discharge path through said device upon the unbalance of said network in either a positive or a negative sense, a second electronic device responsive to reverse the stator circuit of said motor upon the unbalance of said network in one of said senses, and means controlled by said motor to restore the balance to said network and to thereby arrest the rotation of said motor.

2. In an electrical network unbalanced by a change in the magnitude of a condition under observation, a direct current motor having a rotor circuit and a stator circuit, a source of direct current for energizing said stator circuit, a source of alternating current, a first electronic device responsive to connect said source of alternating current over the space discharge path through said device to the rotor circuit of said motor upon the unbalance of said network in either a positive or a negative sense, a second electronic device responsive to reverse the connection of said direct current source to said stator circuit upon the unbalance of said network in one of said senses, and means controlled by said motor to restore the balance to said network and to thereby arrest the rotation of said motor.

3. In an electrical network unbalanced by a change in the magnitude of a condition under observation, a direct current motor having a rotor circuit and a stator circuit, a source of direct current for energizing said stator circuit, a source of alternating current, a first electronic device responsive to connect said source of alternating current over the space discharge path through said device to the rotor circuit of said motor upon the unbalance of said network in either a positive or a negative sense, a second electronic device responsive to the unbalance of said network in one of said senses, a relay operable by said latter device to reverse the connection of said direct current source to said stator circuit, and means controlled by said motor to restore the balance of said network and to thereby arrest the rotation of said motor.

4. In an electrical network, first sources of alternating current of opposite phase, means for applying potential from one or the other of said sources to said network to cause an unbalance thereof in accordance with a change in the magnitude of a condition under observation, a direct current motor having a rotor circuit and a stator circuit, a source of direct current for energizing said stator circuit, second sources of alternating current of opposite phase, a first electronic device having its anode potential supplied from one of said latter sources in series with the rotor circuit of said motor and responsive to the unbalance of said network by the application thereto of potential from either of said first sources, a second electronic device having its anode potential supplied from the other of said second sources and responsive to the unbalance of said network by the application thereto of potential from the first source of the same phase as the anode potential applied to said latter device, a relay operable by said latter device to reverse the connection of said direct current source to said stator circuit, and means controlled by said motor to restore the balance of said network and to thereby arrest the rotation of said motor.

5. In an electrical network, first sources of alternating current of opposite phase, means for applying potential from one or the other of said sources to said network to cause an unbalance thereof in accordance with a change in the magnitude of a condition under observation, a direct current motor having a rotor circuit and a stator circuit, a source of direct current for energizing said stator circuit, second sources of alternating current of opposite phase, a first electronic device having its anode potential supplied from one of said latter sources in series with the rotor circuit of said motor and responsive to the unbalance of said network by the application of potential from either of said first sources whereby said motor is caused to rotate, means for impressing the counter-electromotive force of said motor upon said device whereby said motor will accelerate only to a speed such that its counter-electromotive force equals the potential impressed from said network upon the grid of said device, a second electronic device having its anode potential supplied from the other of said second sources and responsive to the unbalance of said network by the application thereto of potential from the first source that is of the same phase as the anode potential applied to said device, a relay operable by said latter device to reverse the connection of said direct current to said stator circuit, and means controlled by said motor to restore the balance to said network and to thereby arrest the rotation of said motor.

6. In an electrical network, first sources of alternating current of opposite phase, means for applying potential from one or the other of said sources to said network to cause an unbalance thereof in accordance with a change in the magnitude of a condition under observation, a direct current motor having a rotor circuit and a stator circuit, a source of direct current for energizing said stator circuit, a first and a second electronic device, means for critically biasing said devices for response to signal potentials applied thereto from said first sources of alternating current, second sources of alternating current of opposite phase for supplying anode potential of one phase to one of said devices over said rotor circuit and for supplying anode potential of the opposite phase to the other of said devices, means for rendering said first device responsive to the unbalance of said network by the application thereto of potential from either of said first sources to cause the operation of said motor, said second device being responsive only to the unbalance of said network by the application thereto of potential from the first source that is of the same phase as the anode potential applied to said device, a relay operable by said second device to reverse the connection of said direct current source to said stator circuit, and means controlled by said motor to restore the balance to said network and to thereby arrest the rotation of said motor.

7. In an electrical network, first sources of alternating current of opposite phase, means for applying potential from one or the other of said sources to said network to cause an unbalance thereof in accordance with a change in the magnitude of a condition under observation, a direct current motor having a rotor circuit and a stator circuit, a source of direct current for energizing said stator circuit, second sources of alternating current of opposite phase, a first electronic device having its anode potential supplied from one of said latter sources in series with the rotor circuit of said motor, means for rendering said device responsive to the unbalance of said network by the application thereto of potential from either of said first sources including a full wave rectifier, a second electronic device having its anode potential supplied from the other of said second sources and responsive to the unbalance of said network by the application thereto of potential from the first source of the same phase as the anode potential applied to said latter device, a relay operable by said latter device to reverse the connection of said direct current source to said stator circuit, and means controlled by said motor to restore the balance of said network and to thereby arrest the rotation of said motor.

8. In an electrical network, first sources of alternating current of opposite phase, means for applying potential from one or the other of said sources to said network to cause an unbalance thereof in accordance with a change in the magnitude of a condition under observation, a direct current motor having a rotor circuit and a stator circuit, a source of direct current for energizing said stator circuit, second sources of alternating current of opposite phase, a first electronic device having its anode potential supplied from one of said latter sources in series with the rotor circuit of said motor, means for rendering said device responsive to the unbalance of said network by the application thereto of potential from either of said first sources including a full wave rectifier for applying said potential to the grid of said device whereby said motor is caused to rotate, means for impressing the counter-electromotive force of said motor upon the grid of said device whereby the speed of said motor is controlled by said device, said rectifier being so poled that said counter-electromotive force cannot be applied therethrough to said network, a second electronic device having its anode potential supplied from the other of said second sources and responsive to the unbalance of said network by the application thereto of potential from the first source that is of the same phase as the anode potential applied to said device, a relay operated by said latter device to reverse the connection of said direct current to said stator circuit, and means controlled by said motor to restore the balance to said network and to thereby arrest the rotation of said motor.

9. In an electrical network unbalanced by a change in the magnitude of a condition under observation, a direct current motor having a rotor circuit and a stator circuit, a source of direct current for energizing said stator circuit, a source of alternating current, a first electronic device responsive to connect said source of alternating current over the space discharge path through said device to the rotor circuit of said motor upon the unbalance of said network in either a positive or a negative sense, a second electronic device responsive to the unbalance of said network in one of said senses, a relay operable by said latter device to reverse the connection of said direct current source to said stator circuit, a shaft driven by said motor, means driven by said shaft to restore the balance to said network and to thereby arrest the rotation of said motor, and means operable by said shaft to arrest the rotation of said motor if said shaft is driven beyond a fixed limit in either direction of rotation.

10. In an electrical network unbalanced by a change in the magnitude of a condition under observation, a direct current motor having a rotor circuit and a stator circuit, a source of direct current for energizing said stator circuit, a source of alternating current, a first electronic device responsive to connect said source of alternating current over the space discharge path through said device to the rotor circuit of said motor upon the unbalance of said network in either a positive or a negative sense, a second electronic device responsive to the unbalance of said network in one of said senses, a relay operable by said latter device to reverse the connection of said direct current source to said stator circuit, a shaft driven by said motor, means driven by said shaft to restore the balance of said network and to thereby arrest the rotation of said motor, limit switches operable by said shaft when said shaft is driven beyond a fixed limit in either direction of rotation, and a relay operable by said switches to open the rotor circuit of said motor to arrest the rotation thereof.

11. In an electrical network unbalanced by a change in the magnitude of a condition under observation, a direct current motor having a rotor circuit and a stator circuit, a source of direct current for energizing said stator circuit, a source of alternating current, a first electronic device responsive to connect said source of alternating current over the space discharge path through said device to the rotor circuit of said motor upon the unbalance of said network in either a positive or a negative sense, a second electronic device to reverse the connection of said direct current source to said stator circuit, a shaft driven by said motor, means driven by said shaft to restore the balance to said network and to thereby arrest the rotation of said motor, a relay operable to open the rotor circuit of said motor, and limit switches operative by said shaft when said shaft is driven beyond a fixed limit in either direction of rotation to open the stator circuit of said motor and to operate said relay to open the rotor circuit of said motor whereby the rotation of said motor is arrested.

WALTER P. ALBERT.
RICHARD C. DAVIS.
ROBERT H. GUMLEY.
WILLIAM H. T. HOLDEN.

REFERENCES CITED

The following references are of record in the file of this patent:

UNITED STATES PATENTS

| Number | Name | Date |
|---|---|---|
| 1,942,587 | Whitman | Jan. 9, 1934 |
| 1,960,350 | Shackleton et al. | May 29, 1934 |
| 2,346,838 | Haight | Apr. 18, 1944 |
| 2,150,006 | Parker et al. | Mar. 7, 1939 |
| 2,342,685 | Norcross | Feb. 29, 1944 |